(12) United States Patent
Kim

(10) Patent No.: US 6,195,255 B1
(45) Date of Patent: Feb. 27, 2001

(54) NOTEBOOK COMPUTER AND WRIST SUPPORT

(76) Inventor: Stanley A. Kim, 1808 Barnstable Rd., Wellington, FL (US) 33414

( * ) Notice: Subject to any disclaimer, the term of this patent is extended or adjusted under 35 U.S.C. 154(b) by 0 days.

(21) Appl. No.: 09/165,658

(22) Filed: Oct. 3, 1998

(51) Int. Cl.$^7$ .................. G06F 1/16; H05K 7/16
(52) U.S. Cl. .......... 361/683; 361/680; 248/118.1; 400/715
(58) Field of Search ............ 361/683, 680; 364/708.1; 248/118, 118.1, 118.3, 918, 631; 400/715, 691, 693

(56) References Cited

U.S. PATENT DOCUMENTS

| | | | |
|---|---|---|---|
| 5,374,018 | | 12/1994 | Daneshvar . |
| 5,421,543 | * | 6/1995 | Rossman et al. ............ 248/118.3 |
| 5,470,036 | | 11/1995 | Vu Huy et al. . |
| 5,507,458 | * | 4/1996 | Campbell et al. ............ 248/118.3 |
| 5,566,913 | * | 10/1996 | Prokop ........................ 248/118 |
| 5,568,907 | * | 10/1996 | Wolfe et al. .................. 248/118 |
| 5,570,268 | * | 10/1996 | Selker ........................... 361/683 |
| 5,572,941 | | 11/1996 | Arnos . |
| 5,596,481 | * | 1/1997 | Liu et al. ..................... 361/683 |
| 5,596,482 | * | 1/1997 | Horikoshi ................... 361/683 |
| 5,601,264 | | 2/1997 | Peart . |
| 5,641,588 | * | 6/1997 | Sieminski et al. ........... 361/683 |
| 5,724,224 | * | 3/1998 | Howell et al. ............... 361/680 |
| 5,729,480 | * | 3/1998 | Katoh et al. ................. 361/680 |
| 5,818,360 | * | 10/1998 | Chu et al. .................... 248/118.3 |

FOREIGN PATENT DOCUMENTS

| | | |
|---|---|---|
| 44 37 267 | 7/1995 | (DE) . |
| 10-003338 | 4/1998 | (JP) . |
| WO 92 11623 | 7/1992 | (WO) . |

* cited by examiner

Primary Examiner—Leo P. Picard
Assistant Examiner—Lisa Lea-Edmonds
(74) Attorney, Agent, or Firm—Stanley A. Kim

(57) ABSTRACT

Notebook computers having an integrated wrist support device are disclosed. Also disclosed are wrist supports for use with notebook computer keyboards, a wrist support kit, and notebook computer kits.

6 Claims, 6 Drawing Sheets

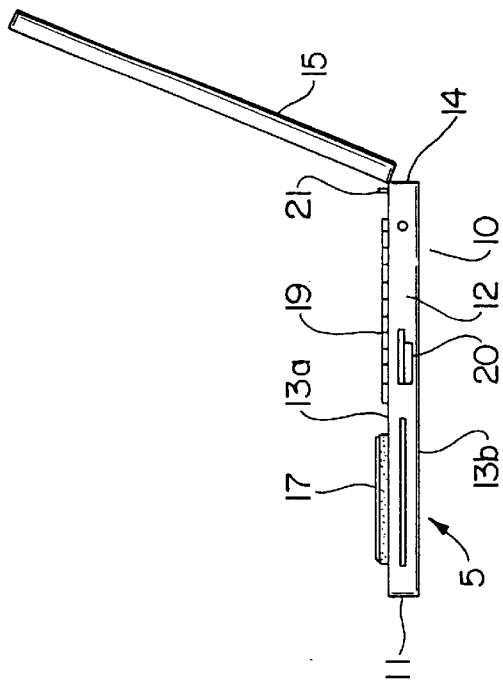
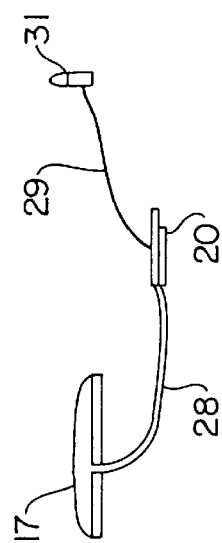
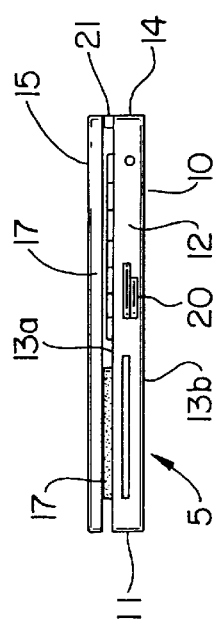
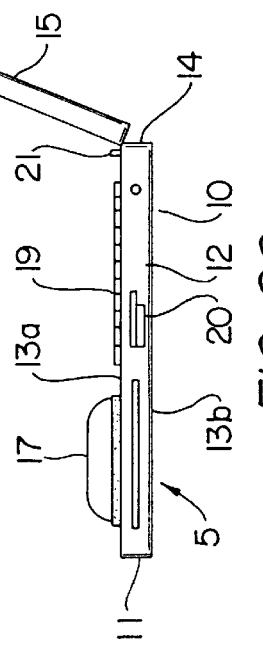

NOTEBOOK COMPUTER AND WRIST SUPPORT

FIELD OF THE INVENTION

The invention relates to notebook computers and wrist supports.

BACKGROUND OF THE INVENTION

Frequent use of computer keyboards can lead to hand strain and repetitive motion injuries such as Carpal Tunnel Syndrome. To prevent these injuries, cushioned pads have been developed that elevate and support a computer operator's wrists while the operator is using a computer keyboard.

A conventional wrist support pad is typically composed of a moldable, gel-like or sponge-like substance that is encased in a non-porous sheath and supported on its bottom by a rigid or semi-rigid base. It is rectangular in shape with a length generally greater than 18 inches and a width usually between about 3 and 5 inches. The length of the pad is fashioned so that it overlaps or approximates the width of a standard keyboard. The width of the pad is designed to accommodate an average person's wrist. Because conventional wrist support pads are generally not affixed to a keyboard or a computer, they may be placed in any one of a multitude of positions to suit a particular computer operator and/or a particular keyboard.

Although wrist support pads come in a variety of shapes and sizes, most are designed for use with the standard full-size keyboards that are commonly used with desktop computers, and not for the type of keyboards that are integrated within the body of portable notebook computers. Thus, existing wrist support pads are often awkward to use with notebook computers. For example, notebook computers often have keyboards that are placed several inches away from the front edge of the computer body. Positioning a wrist support pad immediately in front of the front edge of the computer body leaves the space between the pad and the keyboard too large for comfortable use by a person with average size hands. Moreover, positioning conventional wrist support pads on top of a notebook computer body immediately in front of the keyboard usually interferes with the use of other functional components of the computer, such as its pointing device (e.g., touchpad or trackball), microphone, or speakers.

SUMMARY OF THE INVENTION

The invention relates to notebook computers having built-in wrist support devices. The invention also relates to wrist support devices that are compatible with conventional notebook computers.

In one aspect, the invention features a notebook computer having a computer body, a keyboard, and a wrist support that is integrated within the computer body. In one variation of this notebook computer, the wrist support is integrated within the top panel of the computer body. In another variation, the wrist support is integrated within the front panel of the computer body.

In preferred embodiments, the notebook computers of the invention feature a wrist support that is reversibly inflatable. Some of these notebook computers further feature an inflation controller that includes a fluid pump and/or a bleed valve. In some variations, these notebook computers also feature an inflation control switch that regulates the inflation controller.

Also within the invention is a wrist support for use with a notebook computer keyboard. This wrist support includes a base having one or more flat surfaces, wherein the largest of these flat surfaces has a surface area of less than about 60 $cm^2$. Some embodiments of this wrist support include a fastener for attaching the wrist support to a notebook computer. In the preferred embodiment, this wrist support features a reversibly inflatable bladder.

The invention also features a wrist support kit that includes the aforementioned wrist support with fastener, and an acceptor that can be affixed to a notebook computer in order to supply a connection site for the fastener.

Another feature of the invention is a notebook computer kit that includes a wrist support, a fastener, an acceptor, and a notebook computer. Some embodiments of this notebook computer kit also contain instructions for using (i.e., attaching the wrist support to the notebook computer) the notebook computer kit.

As used herein, the word "keyboard" is used in a generic sense to refer to any device that is used in a repetitive manner to input data into a computer, calculator or like device.

When one object is "integrated" within a second object, it is physically and functionally affixed to and designed to operate in accord with the second object. Thus, when a wrist support is "integrated" within a computer body, it is attached to the computer body in such a manner that both wrist support and computer body operate as one unit.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In the case of conflict, the present specification, including definitions will control. In addition, the particular embodiments discussed below are illustrative only and not intended to be limiting.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

FIG. 2A is a right side view of the embodiment shown in FIG. 1, shown with the wrist support deflated and the video display support in the closed position;

FIG. 2B is a right side view of the embodiment shown in FIG. 1, shown with the wrist support deflated and the video display support in the open position;

FIG. 2C is a right side view of the embodiment shown in FIG. 1, shown with the wrist support inflated and the video display support in the open position;

FIG. 2D is a side view of the wrist support, inflation controller, and inflation control switch of the embodiment shown in FIG. 1, shown with the wrist support fluidly connected to the inflation controller, and the inflation control switch operatively connected to the inflation controller.

DETAILED DESCRIPTION

Figure 1:
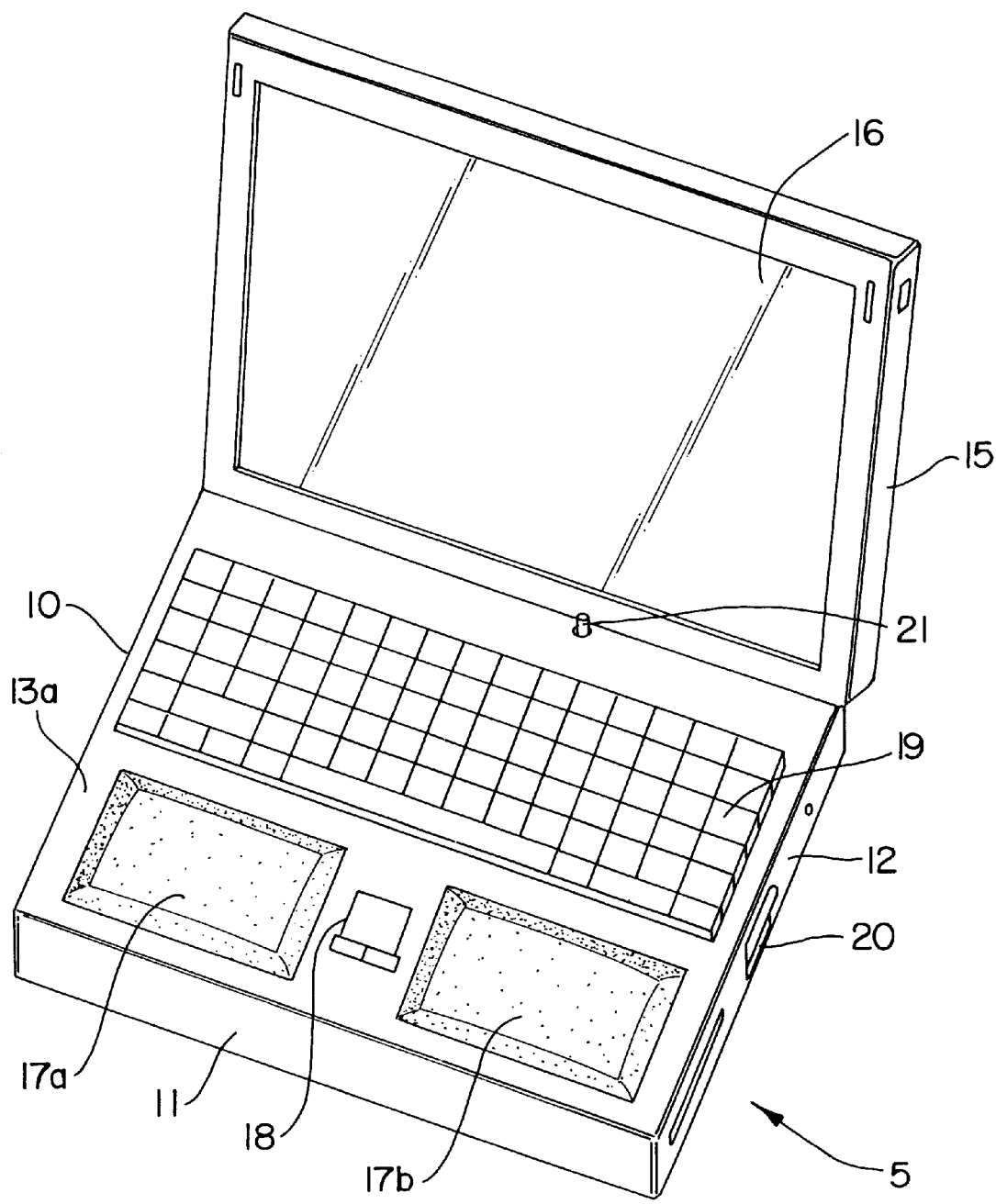
FIG. 1 is a perspective view of one embodiment of the invention.

The invention encompasses notebook computers having an integrated wrist support as well as standard notebook computer components such as a keyboard, pointing device and computer body. As can be seen by comparing different models of currently available notebook computers (e.g., IBM Thinkpad 770™ and Compaq Presario® computers), these standard components may be arranged in myriad different orientations. This notwithstanding, two types of conventional layouts predominate in the marketplace. The first of these has a keyboard oriented on top of the computer body near the video display (see, e.g., FIG. 1). This layout features a relatively large unoccupied space on top of the computer body in the area between the keyboard and the front edge of the computer body. A pointing device such as a touchpad is usually located within this space. In the second type of conventional layout, the keyboard is placed on top of and near the front edge the computer body (see, e.g., FIG. 3A). This layout has only a very small unoccupied space on top of the computer body in the area between the keyboard and the front edge of the computer body.

The below described preferred embodiments illustrate adaptations of wrist supports for use with notebook computers having their components arranged in each of these two conventional layouts. Nonetheless, from the description of these embodiments, other notebook computers of the invention can be readily fashioned by repositioning and/or making slight modifications to the components discussed below.

In brief overview, referring to FIGS. 1, 2A, 2B, 2C, and 2D, an embodiment of notebook computer 5 includes a computer body 10 having a front panel 11, side panels 12 (right side panel is shown; left side panel is not shown), a top panel 13a, a bottom panel 13b and a back panel 14; a video display support 15 containing a video display 16; wrist supports 17a (left) and 17b (right); a pointing device 18; a keyboard 19; an inflation controller 20; an inflation control switch 21; a fluid connector 28; and a switch connector 29.

The notebook computer 5 shown in FIGS. 1, 2A, 2B, and 2C shares many of the same components featured in conventional notebook computers. For example, the bulk of the physical structure of notebook computer 5 consists of computer body 10 and video display support 15. Each of these serve as a supportive and protective housing for other components of the computer. Both computer body 10 and video display support 15 are typically composed of a hard durable material such as a plastic (e.g., polyvinyl chloride) or a metal alloy (e.g., a magnesium alloy). Computer body 10 has a rectangular polyhedron shape formed by front panel 11, side panels 12, top panel 13a, bottom panel 13b and back panel 14. It is movably attached to video display support 15 by a hinge such that video display support 15 can be reversibly positioned immediately on top of and roughly parallel to top panel 13a (i.e., in the closed position; see FIG. 2A for example) or at various angles away from top panel 13a (i.e., in an open position; see FIGS. 2B and 2C for example). The interior of computer body 10 houses various functional parts of the computer such as a central processing unit (CPU), a hard drive, a floppy disk drive, a CD-ROM drive, a battery, etc. The exterior of computer body 10 features devices such as pointing device 18, keyboard 19, a power switch, a microphone, speakers, etc. Video display support 15 houses video display 16 (e.g., an LCD video monitor) which is operatively linked to other functional parts of the computer. The above features are functionally connected in a similar manner as in conventional notebook computers.

Also included within the notebook computer 5 shown in FIGS. 1, 2A, 2B, and 2C are wrist supports 17a (left) and 17b (right), inflation controller 20, and inflation control switch 21. In the embodiment shown, wrist supports 17a (left) and 17b (right) are integrated into computer body 10 at the portions of top panel 13a on each side of pointing device 18 in a position immediately forward of keyboard 19. This orientation is such that the user of notebook computer 5 can comfortably rest his wrists or palms on wrist supports 17a (left) and 17b (right) while his fingers are located in a position convenient for typing on keyboard 19. Wrist supports 17a and 17b are basically bladders composed of an elastic material (e.g., latex or synthetic rubber) that are fillable with a fluid such as a gas (e.g., air, carbon dioxide, or nitrogen) and fluidly connected to a fluid source (e.g., atmospheric air) via fluid connector 28 (see FIG. 2D), a device for transferring fluid from one source to another (e.g., non-porous tubing or the like). They may optionally be covered with fabric (e.g., nylon, polyester, etc.) to enhance their comfort and durability. Each wrist support 17 is reversibly expandable in size by adding or decreasing the amount of fluid contained therein. Wrist supports 17a and 17b may be fluidly connected to each other to form one structure (i.e., wrist support 17). Alternatively, wrist supports 17a and 17b can lack a fluid connection to each other. The latter configuration is preferred where it is desirable to have left and right wrist supports that are independently adjustable.

Inflation controller 20 is a device that regulates the amount of fluid in wrist support 17. In a preferred embodiment, inflation controller 20 comprises a two-way fluid pump that is mounted at a predetermined location on notebook computer 5 (e.g., on computer body 10 at side panel 12 as shown in FIG. 1). In another preferred embodiment, inflation controller 20 comprises a fluid pump and a bleed valve. In either case, as shown in FIG. 2D, the fluid pump (and the bleed valve in the latter configuration) of inflation controller 20 is connected to wrist support 17 and a fluid source (e.g., the air in the atmosphere surrounding notebook computer 5) by fluid connector 28 such that the fluid may reversibly flow from the fluid source through inflation controller 20 into wrist support 17. Where wrist supports 17a and 17b are not fluidly connected to each other, inflation controller 20 is separately connected to wrist support 17a and wrist support 17b such that it independently controls inflation of each wrist support (e.g., there is a separate fluid pump for each wrist support).

Activation of inflation controller 20 causes fluid to flow through fluid connector 28 between the fluid source (e.g., atmospheric air) and wrist support 17. Activation of the fluid pump portion of inflation controller 20 in a forward direction causes fluid to move from the fluid source through inflation controller 20 into wrist support 17, thus inflating wrist support 17. Activation of the fluid pump of inflation controller 20 in a reverse direction causes fluid to move from wrist pad 17 through inflation controller 20 out to the fluid source (e.g., the atmosphere), thus deflating wrist support 17. In the configuration of inflation controller 20 that includes a bleed valve, opening the bleed valve causes fluid to flow out of wrist support 17 fluid connector 28 through fluid connector 28 into the atmosphere via inflation controller 20, thus deflating wrist support 17. In some configurations, the bleed valve portion of inflation controller 20 can be set to automatically open when a threshold fluid pressure is reached. Thus, when wrist support 17 reaches a certain predetermined size or pressure, the bleed valve opens and thereby releases fluid from wrist support 17. In this manner, the maximum size to which wrist support 17 can be expanded can be automatically controlled.

Inflation control switch 21 is a switch device that regulates the operation of inflation controller 20. It is mounted on a predetermined site on notebook computer 5 that is accessible to a user. For example, in the embodiment shown in FIG. 1, inflation control switch 21 is affixed to computer body 10 on top panel 13a near video display support 15. As shown in FIG. 2D, inflation control switch 21 is operatively linked (e.g., mechanically, hydraulically, or electrically) to inflation controller 20 via switch connector 29, a device that operatively links inflation control switch 21 to inflation controller 20 (e.g., an electrical wire, a mechanical cable, or hydraulic hosing). It has an inflate position, a stop position, and a deflate position. When placed in the inflate position, inflation control switch 21 signals inflation controller 20 to activate its fluid pump to send fluid into and thereby inflate wrist support 17. When placed in the deflate position, inflation control switch 21 signals inflation controller 20 to reverse its fluid pump and/or open its bleed valve to thereby deflate wrist support 17. When placed in the stop position, inflation control switch 21 signals inflation controller 20 to either stop inflating or stop deflating wrist support 17.

An overview of the operation of the foregoing preferred embodiment is shown in FIGS. 2A, 2B, and 2C. In FIG. 2A, notebook computer 5 is shown in the closed position with wrist support 17 deflated. Deflation of wrist support 17 permits video display support 15 to be placed immediately on top of and roughly parallel to top panel 13a so that notebook computer 5 is in a compact configuration (i.e., with video display support 15 in the closed position) that enhances the portability of notebook computer 5. To operate notebook computer 5, a user moves video display support 15 to an open position such that the user can view video display 16 (see, e.g., FIG. 2B) and then boots up the computer. To utilize wrist support 17, the user then places inflation control switch 21 in the inflate position, thus activating the fluid pump of inflation controller 20 to send fluid into wrist support 17 via fluid connector 28. When wrist support 17 is inflated to the desired size (one example is depicted in FIG. 2C), the user then places inflation controller switch 21 in the stop position to halt fluid flow into wrist support 17. Thus, in this configuration, the user can operate notebook computer 5 much like a conventional notebook computer except that his wrists or palms are comfortably propped on inflated wrist support 17. Because wrist support 17 can be inflated to an infinite number of positions up to a maximum inflation position, each different user can adjust the size of wrist support 17 to his liking.

When the user has completed operating notebook computer 5, he can restore it to the compact and portable configuration shown in FIG. 2A by placing inflation control switch 21 in the deflate position. In this position, inflation control switch 21 causes deflation of wrist support 17 by activating the fluid pump of inflation controller 20 to remove the fluid from wrist support 17 and/or opening the bleed valve portion of inflation controller 20 to thereby release the fluid from wrist support 17. In some variations of this embodiment, the user can apply pressure to wrist support 17 (e.g., by manually squeezing wrist support 17) to hasten the release of fluid from (and thus deflation of) wrist support 17. When a sufficient amount of fluid is removed from wrist support 17, inflation control switch 21 is placed in the stop position. The user can then place video display support 15 immediately on top of and roughly parallel to top panel 13a (FIG. 2A).

In another variation of this preferred embodiment, operation of inflation control switch 21 is automatic or semiautomatic. For example, as shown in FIGS. 1, 2A, 2B, and 2C, inflation control switch 21 is positioned on top panel 13a adjacent to video display support 15. In this variation, inflation control switch 21 is designed as a pushbutton-type device (e.g., a spring-loaded piston movably mounted within an open-ended cylinder) that has a depressed position where the top of the pushbutton is approximately flush with the surface of top panel 13a, and non-depressed positions where the pushbutton extends perpendicularly away from top panel 13a for various short distances (such as 0.5, 1, or 2 cm) up to a maximum non-depressed position in which the pushbutton is fully extended. The pushbutton-type device is biased so that it is in the maximum non-depressed position in the absence of extraneous forces.

When the video display support of notebook computer 5 is in the closed position (such as shown in FIG. 2A), the pushbutton of inflation control switch 21 is held in the depressed position by contact from a portion of video display support 15. This position corresponds to the stop position discussed above (i.e., inflation controller 20 is inactivated). When video display support iS is placed in an open position, the pushbutton of inflation control switch 21 rises to a non-depressed position as a result of its bias. This movement from a depressed position to a nondepressed position places inflation control switch 21 in the inflate position and thereby signals inflation controller 20 to send fluid into wrist support 17. After wrist support 17 reaches a preset inflation level, inflation controller 20 automatically returns to an inactivated state (e.g., inflation controller 20 has a pressure sensor that turns off the fluid pump of inflation controller 20 when a threshold pressure is detected). Because the pushbutton of inflation control switch 21 abuts against a portion of video display support 15, lowering video display support 15 to return it to the closed position gradually pushes inflation control switch 21 downward toward the depressed position. This downward push places inflation control switch 21 in the deflate position and thereby signals inflation controller 20 to remove fluid from wrist support 17. With wrist support 17 deflated, video display support 15 can be returned to the closed position in which inflation control switch 21 is in the depressed or stop position.

Figure 3A:
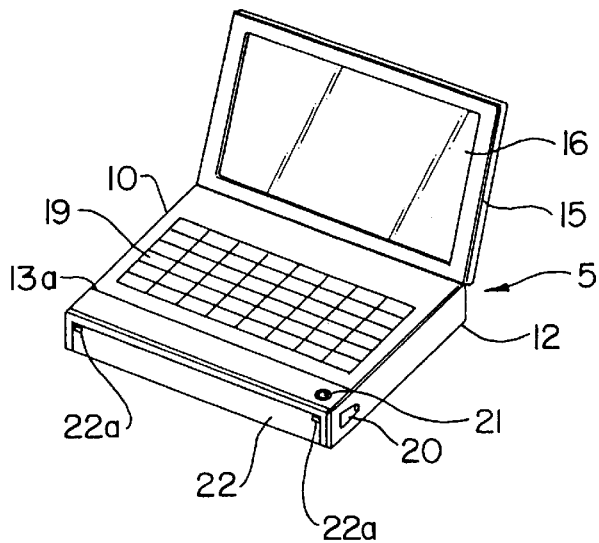
FIG. 3A is a perspective view of another embodiment of the invention, shown with the wrist support panel door in the closed position.
Figure 3B:
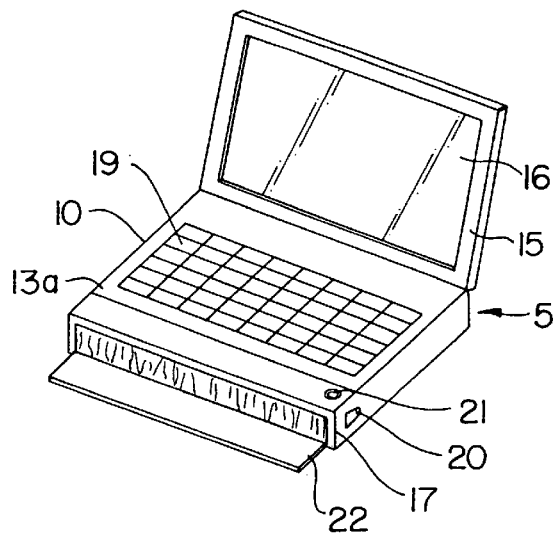
FIG. 3B is a perspective view of the embodiment shown in FIG. 3A, shown with the wrist support panel door in open position and the wrist support deflated.
Figure 3C:
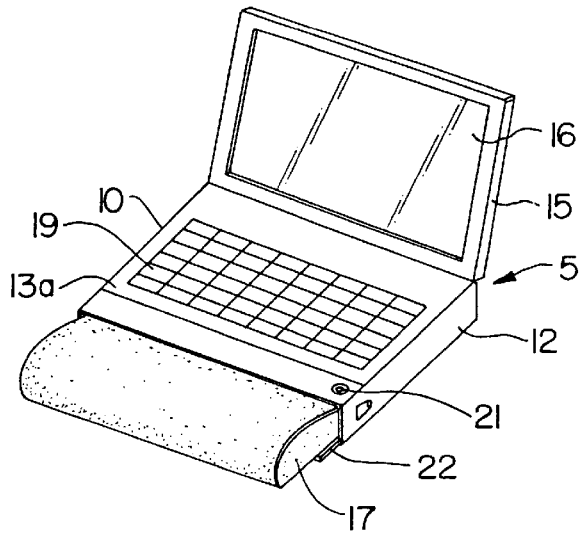
FIG. 3C is a perspective view of the embodiment shown in FIG. 3A, shown with the wrist support panel door in the open position and the wrist support inflated.

Another preferred embodiment of the invention is shown in FIGS. 3A, 3B, and 3C. Similarly to the notebook computer discussed above and shown in FIGS. 1, 2A, 2B, 2C and 2D, this embodiment is a notebook computer that includes a computer body 10 having a front panel 11, side panels 12 (right side panel is shown; left side panel is not shown), a top panel 13a, a bottom panel 13b (not shown) and a back panel 14 (not shown); a video display support 15 containing a video display 16; a wrist support 17; a keyboard 19; an inflation controller 20; an inflation control switch 21; a fluid connector 28 (not shown); and a switch connector 29 (not shown). To illustrate how the above components of the notebook computers of the invention can be arranged in different orientations, notebook computer 5 in FIG. 1 can be compared to notebook computer 5 in FIG. 3A. For example, in the embodiment shown in FIG. 3A, keyboard 19 is oriented closer to front panel 11 than in the embodiment shown in FIG. 1. Likewise, inflation control switch 21 is mounted on top panel 13a near front panel 11 in the embodiment shown in FIG. 3A, whereas it is mounted near video display support 15 in the embodiment shown in FIG. 1.

In the embodiment shown in FIGS. 3A, 3B, and 3C, wrist support 17 of notebook computer 5 is contained within computer body 10 immediately behind front panel 11. This embodiment is preferred for notebook computers having a keyboard placed on top panel 13a at a location near front panel 11 (e.g., IBM Thinkpad 770™) as the lack of available space on the portion of top panel 13a in front of keyboard 19 does not limit placement of wrist support 17. This embodiment optionally features a wrist support panel door 22 that is composed of a material similar to that composing computer body 10 (such as plastic or metal). Wrist support panel door 22 is typically rectangular in shape, and attached to and integrated within front panel 11. As an example, FIGS. 3A and 3B show wrist support panel door 22 hingedly attached to the bottom of front panel 11. Wrist support panel door 22 has a closed position and open positions. In the closed position, wrist support panel door 22 is reversibly locked into computer body 10 by wrist support panel door clasp 22a (any number of such clasps can be used; FIG. 3A shows two such clasps). One open position of wrist support panel door 22 is shown in FIG. 3B. Although wrist support panel door 22 is not required for the function of this embodiment, it is generally a preferred component as it protects wrist support 17 from damage and provides a convenient mechanism for storing wrist support 17 while it is not being used. One exemplary alternative configuration of this embodiment (not shown) has wrist support 17 integrated into computer body 10 at front panel 11 with front panel 11 having a cut-out portion through which wrist support 17 can expand. This configuration resembles notebook computer 5 shown in FIG. 3B except that wrist support panel door 22 is omitted.

In the preferred embodiment, wrist support 17 is a single unit (albeit, multiple wrist supports could also be used) that is essentially a bladder composed of an elastic material (e.g., latex or synthetic rubber). This bladder is fillable with a fluid such as a gas (e.g., air, carbon dioxide, or nitrogen) and fluidly connected to a fluid source (e.g., atmospheric air) via fluid connector 28 (not shown, but see FIG. 2D for a similar example), so that wrist support 17 can be reversibly expanded by adding or decreasing the amount of fluid contained therein. Wrist support 17 is shaped (e.g., the elastic material is pre-molded) so that when expanded it develops a shape conducive for comfortable typing by an operator of the notebook computer. It may optionally be covered with fabric (e.g., nylon or the like) to enhance its feel (i.e., comfort for a user) and/or durability.

The components of this embodiment function quite similarly to the components of the embodiment shown in FIGS. 1, 2A, 2B, and 2C. For example, in this embodiment, inflation controller 20 also comprises a two-way fluid pump (or a fluid pump and a bleed valve) that is mounted at a predetermined location on notebook computer 5. It is also connected to wrist support 17 and a fluid source (e.g., the air in the atmosphere surrounding notebook computer 5) via fluid connector 28 (not shown) such that the fluid can reversibly flow from the fluid source through inflation controller 20 into wrist support 17. Activation of the fluid pump portion of inflation controller 20 in a forward direction causes fluid to flow into (and thereby inflate) wrist support 17. Reversing the direction of the fluid pump removes fluid from (and thereby deflates) wrist pad 17. Where a bleed valve is included as part of inflation controller 20, opening the bleed valve causes fluid to flow out of (and thereby deflate) wrist support 17.

This embodiment also features an inflation control switch 21 for regulating the operation of inflation controller 20. It is placed at a predetermined site on notebook computer 5 (in FIGS. 3A, 3B, and 3C it is shown on top panel 13a near front panel 11 and right side panel 12), and is operatively linked to inflation controller 20 via switch connector 29 (not shown; but see FIG. 2D for a similar example). It has an inflate position, a stop position, and a deflate position. When placed in the inflate position, inflation control switch 21 signals inflation controller 20 to activate its fluid pump to send fluid into and thereby inflate wrist support 17. When placed in the deflate position, inflation control switch 21 signals inflation controller 20 to reverse it fluid pump and/or open its bleed valve to thereby deflate wrist support 17. When placed in the stop position, inflation control switch 21 signals inflation controller 20 to either stop inflating or stop deflating wrist support 17.

The operation of this preferred embodiment is very similar to the operation of the embodiment shown in FIGS. 2A, 2B, 2C, and 2D. In FIG. 3A, notebook computer 5 is shown with wrist support 17 deflated and wrist support panel door 22 in the closed position. To inflate wrist support 17, the user first opens wrist support panel door 22 and then places inflation control switch 21 in the inflate position, thus activating the fluid pump of inflation controller 20 to send fluid into wrist support 17. In one variation of this embodiment, wrist support panel door clasp 22a can be designed so that wrist support panel door 22 automatically opens while wrist support 17 is being inflated. For example, wrist support panel door clasp 22a can be a hook and loop-type connector (e.g., Velcro®) that comes apart when subjected to a predetermined force such as the pressure caused by the inflation of wrist support 17. When wrist support 17 is inflated to a desired size (e.g., as depicted in FIG. 3C), the user then places inflation controller switch 21 in the stop position to cut off fluid flow into wrist support 17. To restore the compact and portable configuration of notebook computer 5 (as shown in FIG. 3A), inflation control switch 21 is placed in the deflate position. This causes inflation controller 20 to remove the fluid from wrist support 17 as described supra. In some cases, the user can apply pressure to wrist support 17 to hasten deflation of wrist support 17. When a sufficient amount of fluid is removed from wrist support 17, inflation control switch 21 can be placed in the stop position. The deflated wrist support 17 can be stowed in computer body 10 and secured by closing wrist support panel door 22.

As shown in FIGS. 4A, 4B, 4C, 4D, 4E, and 5, another preferred embodiment of the invention is a wrist support that is detachably affixable to the body of a notebook computer. In this embodiment, wrist pad 17 includes an inflation controller 20, a base 23, a bladder 24, bladder cover 25, and a fastener 26. To facilitate compatibility with notebook computers, the total area of the largest flat surface of wrist pad 17 is less than about 60 cm$^2$ (e.g., 25, 30, 45, 50, or 55 cm$^2$). The specific dimensions and shape of wrist pad 17 can be chosen to match the particular layout of a given notebook computer.

Although, in some embodiments, base 23 can be used alone as a wrist support (especially if base 23 is composed of a soft, compressible material such as synthetic sponge), in the particular embodiment shown in FIGS. 4A, 4B, 4C, 4D, 4E, and 5, base 23 is a structure that forms and maintains the shape of the bottom portion of wrist pad 17. It is roughly rectangular in shape and composed of a rigid or semi-rigid material such as plastic or reinforced rubber. Base also serves as a structure on which to mount other components of wrist pad 17 such as bladder 24, bladder cover 25, and/or fastener 26.

Bladder 24 is fixedly attached to base 23. It is essentially an elastic balloon (e.g., a latex or synthetic rubber balloon) that is fillable with a compressible substance such as a gas (e.g., air, carbon dioxide, or nitrogen) or a sponge-like material. By adding or decreasing the amount of compressible substance contained within bladder 24 (e.g., via a connection to a source of said substance), wrist support 17 can be reversibly expanded.

In a preferred configuration of this embodiment, the compressible substance is atmospheric air. In this configuration, bladder 24 is biased so as to be in an expanded configuration when not subjected to an extraneous force (much like the inflation bulb in a standard manual sphygmomanometer). Bladder 24 communicates with the atmosphere via inflation controller 20, which in this embodiment is a valve directly attached to bladder 24 that has an open and a closed position. When inflation controller 20 is in the open position, air from the atmosphere can flow in and out of bladder 24. When inflation controller 20 is in the closed position, air from the atmosphere cannot flow in or out of bladder 24. Because of bladder 24's bias, when inflation controller 20 is in the open position bladder 24 is in an inflated state (see FIG. 4B). When the inflation controller 20 is then placed in the closed position, air cannot escape bladder 24, and thus wrist support 17 is stabilized in the inflated state. When inflation controller 20 is left in the open position, a user can compress (e.g., by manually squeezing) bladder 24 to a desired inflation state and then close inflation controller 20 so that the chosen inflation state is stabilized (see FIG. 4A).

Similarly, a user can partially or completely deflate wrist support 17 by partially or fully compressing bladder 24. This deflated state can be stabilized by either continuing the compressing force, or by placing inflation controller 20 in the closed position. In this manner the size of wrist support 17 can be minimized to facilitate its portability and/or storage. In some variations, wrist support 17 can be deflated while attached to a notebook computer so that the video display support of the notebook computer can be placed in the closed position without wrist support 17 being detached.

Figure 4A:
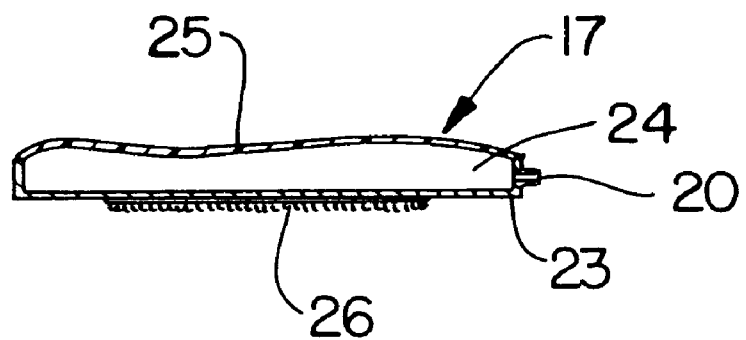
FIG. 4A is a side view of a detachable wrist support shown in an uninflated position.
Figure 4B:
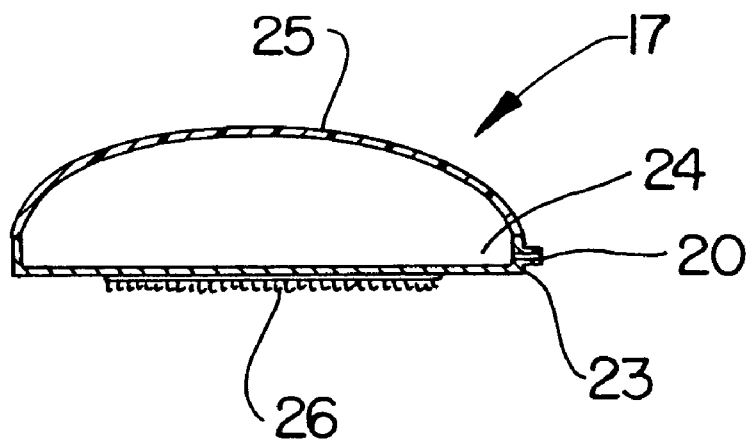
FIG. 4B is a side view of the detachable wrist support featured in FIG. 4A shown in an inflated position.
Figure 4C:
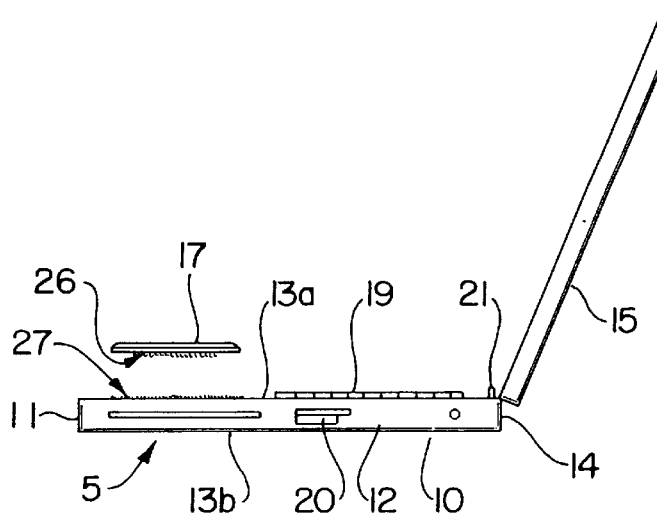
FIG. 4C is a side view of a notebook computer and a detachable wrist support, shown with the wrist support detached from the notebook computer.

Other components of the wrist support device shown in FIGS. 4A, 4B, 4C, 4D, 4E, and 5 include bladder cover 25, fastener 26, and acceptor 27. Bladder cover 25 is a piece of fabric (e.g., nylon or the like) that is placed over bladder 24 (as shown in FIGS. 4A and 4B) in order to reinforce and protect bladder 24, and/or to enhance the esthetics or feel (for user comfort) of wrist pad 17. Fastener 26 and acceptor 27 are devices used for attaching wrist support 17 to notebook computer 5.

Figure 4D:
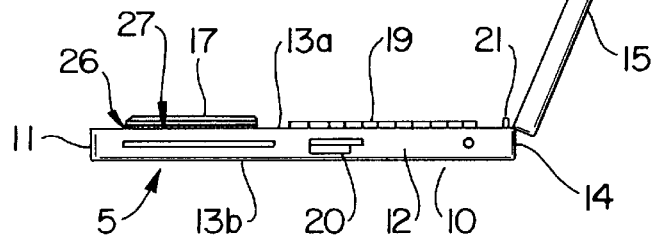
FIG. 4D is a side view of a notebook computer and a detachable wrist support, shown with the wrist support attached to the notebook computer and in an uninflated position.
Figure 4E:
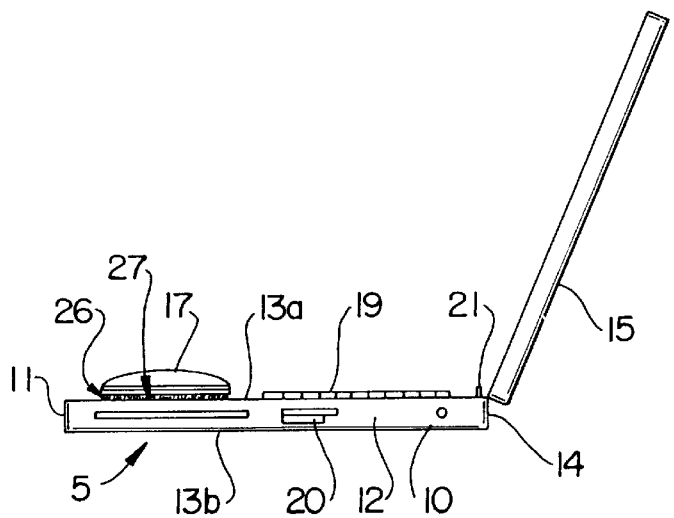
FIG. 4E is a side view of a notebook computer and a detachable wrist support, shown with the wrist support attached to the notebook computer and in an inflated position.
Figure 5:
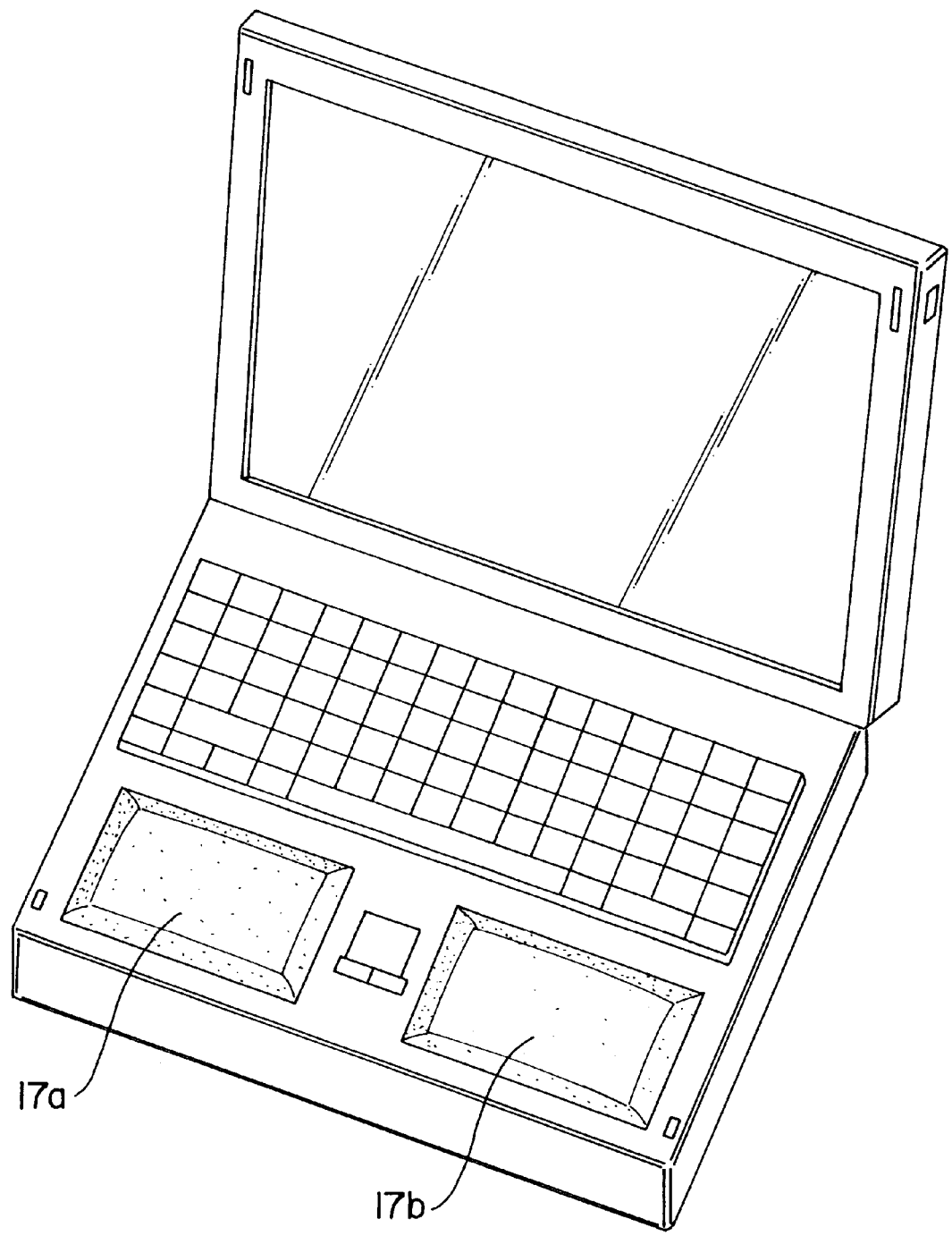
FIG. 5 is a perspective view of a notebook computer and a detachable wrist support, shown with the wrist support attached to the notebook computer.

Fastener 26 is attached to the bottom portion of wrist support 17. It can be any type of device that can mediate the attachment of wrist support 17 to the surface of computer body 10 (e.g., an adhesive tape, a magnet, or a mechanical lock). In the preferred embodiment shown in FIGS. 4A, 4B, 4C, 4D, and 4E, fastener 26 is a one component of a hook and loop-type connector such as Velcro® (i.e., fastener 26 is the hook or the loop component of the connector). In this configuration, to affix wrist support 17 to notebook computer 5, acceptor 27 is first mounted (e.g., using an adhesive) to an unoccupied area on the surface of computer body 10 (see FIG. 4C). Acceptor 27 is one component of a two component connector (e.g., a hook and loop-type connector) that is attachable to fastener 26. For example, in the preferred embodiment, where fastener 26 is the hook component of a hook and loop-type connector, acceptor 27 will be the loop component of the connector, and vice versa. As shown in FIG. 4D, wrist support 17 is then placed onto notebook computer 5 so that fastener 26 engages acceptor 27. Wrist support 17 is thus affixed to the notebook computer (see FIG. 4D for a side view and FIG. 5 for a perspective view). While in this position wrist support 17 can be in a deflated position (FIG. 4D) or an inflated position (FIG. 4E). Wrist pad 17 can be removed from notebook computer 5 by simply prying it from the surface of computer body 10 with sufficient force to disengage fastener 26 from acceptor 27.

From the foregoing, it can be appreciated that the notebook computers and wrist supports of the invention permit the use of a keyboard in a comfortable and ergonomic manner.

While the above specification contains many specifics, these should not be construed as limitations on the scope of the invention, but rather as examples of preferred embodiments thereof. Many other variations are possible. For example, a notebook computer having an inflatable wrist support integrated into the top panel of the computer body wherein inflation of the wrist support causes it to expand in such a manner as to overlap the front panel of the computer body, is included within the invention. As another example, a notebook computer having a wrist support in communication with a self-contained, pressurized fluid reservoir (e.g., a tank containing pressurized nitrogen gas) such that the fluid reservoir can provide fluid to inflate the wrist support is within the invention. Accordingly, the scope of the invention should be determined not by the embodiments illustrated, but by the appended claims and their legal equivalents.

What is claimed is:

1. A notebook computer comprising: a computer body having a top panel, a keyboard, and a wrist support, the wrist support being integrated within the top panel of the computer body;

wherein said computer body further comprises an inflation means for inflating said wrist support when said notebook computer is in the open or use position and a deflation means for deflating said wrist support whereby said notebook computer can be in a closed or stored position.

2. A notebook computer comprising: a computer body having a front panel, a keyboard, and a wrist support, the wrist support being integrated within the front panel of the computer body.

3. The notebook computer of claim 2, wherein the wrist support is reversibly inflatable.

4. The notebook computer of claim 3, wherein the notebook computer further comprises an inflation pump comprising a fluid pump.

5. The notebook computer of claim 3, wherein the notebook computer further comprises an inflation pump comprising a bleed valve.

6. The notebook computer of claim 3, wherein the notebook computer further comprises an inflation control switch.

* * * * *